April 20, 1965 J. T. FERRIS ETAL 3,178,993

OPTICAL CRYPTOGRAPHIC DEVICES

Filed Oct. 7, 1960 2 Sheets-Sheet 1

INVENTOR.
ROBERT J. MELTZER
JOHN T. FERRIS
BY Hoffman Stone
Frank C. Parker
David E. Dougherty
ATTORNEYS & AGENT INVENTOR.
ROBERT J. MELTZER
JOHN T. FERRIS
BY
Hofman Stone
Frank C. Parker
David E. Dougherty
ATTORNEYS & AGENT United States Patent Office 3,178,993

Patented Apr. 20, 1965

3,178,993

OPTICAL CRYPTOGRAPHIC DEVICES

John T. Ferris, Pittsford, and Robert J. Meltzer, Irondequoit, N.Y., assignors to Bausch & Lomb Incorporated, Rochester, N.Y., a corporation of New York Filed Oct. 7, 1960, Ser. No. 61,270
10 Claims. (Cl. 88—1)

This invention relates to novel optical cryptographic devices, and, more particularly, to novel optical cryptographic devices including arrays of optical dissector elements.

The cryptographic device of the present invention is expected to be particularly useful in commercial fields such as banking and credit wherein substantial economies and improved efficiency may be realized by having each bank depositor or person to whom credit is extended carry his own identification card bearing his personal signature or other identifying subject matter. In those instances where this is presently done, the signature or other matter appears in clear text, with a resultant risk of forgery in the event the card is lost and then found by an unscrupulous person. It is understood that personal credit companies have experienced substantial losses in this way. There is, accordingly, a relatively large potential demand for a cryptographic system which permits the identifying subject mater to be placed on personal identification cards in cryptographic form so as to be substantially meaningless to a casual finder. The cryptogram should also be readily decipherable for comparison with a signature made by the person presenting the card at the time of its presentation. Banks, particularly savings banks, have indicated a desire to adopt such a system, placing personal signature cryptograms on their savings account passbooks, thereby permitting their tellers to make instantaneous signature comparisons without the need to leave their cages to consult a central file of signature cards.

The device of the present invention is, of course, not limited to such use but may also be applied in many other fields, and for other purposes, wherever an optical cryptographic device has application. Devices according to the invention may be easily produced by mass production techniques at relatively low cost. They are readily adaptable to the use of cryptographic keying techniques so that several different cipher keys may be used within a single system, thereby enabling the achievement of a relatively high degree of cryptographic security.

Several representative embodiments of the invention will now be described in detail in conjunction with the accompanying drawings, in which.

Briefly, an optical cryptographic device according to the presently preferred embodiment of the invention includes means defining a field of limited area in a selected object plane, and an optical image dissector consisting of a screen composed of optical image forming elements spaced from the object plane for forming aerial images of portions of the object plane in a selected image plane. The image forming elements are small relative to the area of the field so that the aerial images formed by the screen are differently oriented relative to each other from the orientation of the corresponding portions of the object plane, thereby forming an optical cryptogram.

Preferably, the sizes of the image forming elements are selected in view of the subject matter to be enciphered to insure the formation of a difficultly decipherable cryptograph. For enciphering personal signatures, for example, it has been found that a lenticle dimension of about one tenth inch provides optimum or near optimum cryptographic security.

Figures 1, 2:
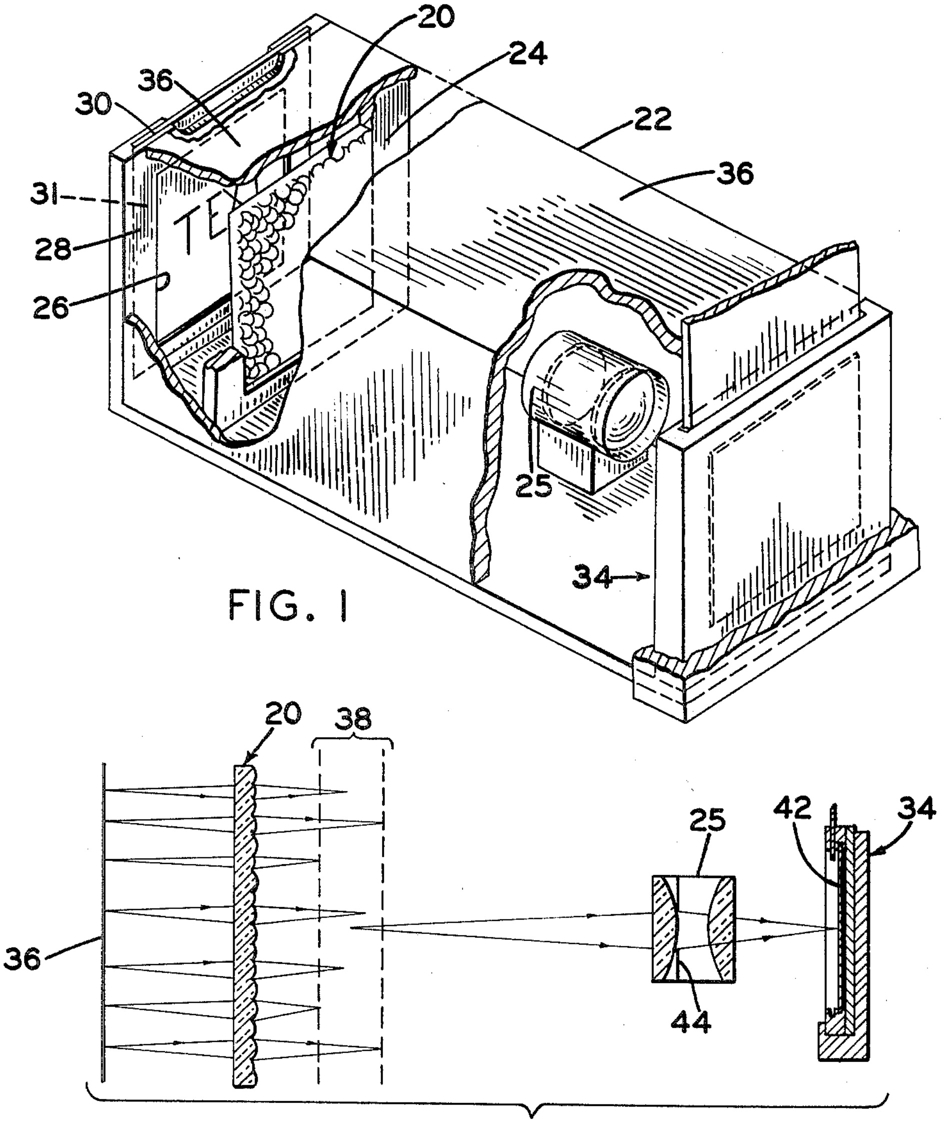
FIG. 1 is a partly schematic isometric view of an optical cryptographic device according to the presently preferred embodiment of the invention including a screen composed of spherically curved lenticles and a relay lens including an aperture stop.
FIG. 2 is a schematic longitudinal sectional view of the device shown in FIG. 1.
Figure 3:
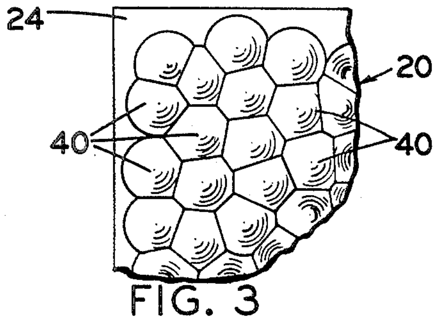
FIG. 3 is a fragmentary elevational view on an enlarged scale of the lenticular screen of the device shown in FIGS. 1 and 2.

Referring now to the drawings, a cryptographic device according to a presently preferred embodiment of the invention is shown in FIGS. 1, 2, and 3. The device includes a lenticular screen 20 mounted in a housing 22 by any desired means, such as the frame 24 illustrated. A relay objective lens 25 is also mounted within the housing, spaced from and axially aligned with the screen 20. An aperture 26 is formed in the front wall 28 of the housing adjacent to the screen 20, and means such as the slot 30 and groove 31 shown are provided for receiving and supporting a card or the like, upon which the matter to be enciphered is carried, in position across the aperture 26. When the device is used for enciphering, as shown, a film holder 34 is fixed at the rear of the housing 22, and forms the rear wall thereof.

In operation, for making a cryptogram from clear text such as from a card 36 bearing a personal signature or other identifying subject matter, the object bearing the text is placed in the slot and groove in the front wall 28 of the housing, where it is supported generally parallel to and spaced from the screen 20. The text is illuminated by any desired means (not shown). The screen 20 forms aerial images of different portions of the text in a region designated by the dashed lines 38 between the screen 20 and the relay objective lens 25. If all of the lenticles 40 of the screen are of equal power, the aerial images are all formed in a common plane. If the lenticles are of various different powers, the images lie in different planes.

The relay objective 25 relays selected portions of the images formed by the screen 20 to the film 42, which is supported in the film holder 34. The objective 25 is stopped down so that its depth of field is at least sufficient to accommodate all of the aerial images formed in the region 38 in the event the lenticles 40 are of different respective powers, and to focus the final composite image upon the film 42.

The objective lens 25 includes an aperture stop 44, which may be in the form of an interelement diaphragm, as illustrated, or in any other desired form. The stop 44 acts to restrict the degree of overlap between adjacent image portions in the final composite image, even though there may be a large degree of overlapping among the different aerial images formed by the screen 20. The final image projected upon the film 42 thus represents selected portions of the aerial images formed by the screen 20, with overlapping portions present only to a controlled extent.

Images of the different portions of the text 36 projected through different ones of the lenticles 40 are optically rotated separately about the axes of the respective lenticles, so that their relative orientations in the aerial image region 38, and also in the final image are different from the relative orientations of the corresponding portions of the text.

The restriction of overlap of the adjacent portions of the final composite image is important in order to avoid excessive loss of contrast during reconstitution of the original subject matter when it is desired to decipher the cryptogram.

After the film is exposed, it is developed and may be used by itself as the cryptogram, or a print may be made from it upon any desired surface such as a personal identification card, or a savings bank passbook.

When it is desired to decipher the cryptogram, it is placed in the same, or similar device as the one shown in FIG. 1 in the film holder position, and a ground glass screen or other type of diffusion plate (not shown) is placed in the position previously occupied by the text 36 in the object plane defined by the front wall 28 of the housing. The cryptogram is then illuminated and a clear text image of the original text appears on the diffusion plate.

If the cryptogram is full scale, that is, if it is substantially the same size as the original clear text, it may be deciphered by placing it at the plane ordinarily occupied by the aerial image and illuminating it so it is imaged through the lenticular screen 20 upon a ground glass screen supported in the object plane. However, because of the effect of overlap, as discussed in greater detail hereinafter, the image formed without the relay lens 25 suffers greater loss of contrast than an image formed from an aerial image projected through the relay lens. This comes about because of the effect of the stop 44, which acts to direct the rays of the aerial image toward different respective lenticles of the sccreen 20.

Alternatively, if the cryptogram is of a different size from the original text, it may be deciphered by direct projection through a dissector screen generally similar to the scren 20 with which the crytogram was originally made, but scaled in size according to the scale ratio between the original clear text and the cryptogram. For example, if the cryptogram is smaller than the original clear text by a ratio of two diameters, it may be deciphered by projecting it through an image dissector screen smaller than the original screen by two diameters and otherwise exactly similar to it.

In order to achieve maximum cryptographic security, it is desirable to limit the extent of image duplication, that is, to limit the number of images of individual area portions of the clear text that appear in the final composite image constituting the cryptogram. The extent of image duplication will be determined largely by the sizes of the lenticles 40 and the conjugate ratios at which they work. The amount of duplication will vary inversely in accordance with the lenticle size. If the conjugates are chosen to produce a relatively large minification, there will be a relatively large amount of image duplication, because each lenticle will form an aerial image including a relatively large area portion of the text. It is possible, by appropriate choice of conjugates, to have each lenticle form a separate image of the entire text so that the final cryptogram would merely be an array of complete images of the clear text on a greatly reduced scale. This would defeat the purpose of the device. It is necessary optically to divide up the clear text into different area portions without excessive duplication of images of different adjacent portions of the text. Preferably, image duplication in the final cryptogram is restricted to less than about four times, at a first approximation. Toward this end, the lenticles 26 of the array are preferably arranged to operate at conjugates such that the aerial images are at least about one half scale relative to the object surface.

The actual image duplication in the cryptogram is subject to several different effects including not only the working conjugates of the lenticles 40, but also the size of the aperture stop 44, and the positions of the different respective lenticles relative to the optical axis of the stop 44. Some of the duplications will be fully illuminated because the entire cones of rays forming them will pass through the aperture stop 44. Others will be only dimly illuminated because the cones of rays forming them are partly excluded from the final image surface by the stop 44. The term, first approximation, as used herein in respect of image duplication, refers only to those duplicate images that are fully illuminated.

The entire aerial image formed by each lenticile will usually be substantially larger than the size of the lenticle itself, and to this extent, the aerial images overlap each other.

Excessive overlapping of the separate images in the final composite image, which constitutes the cryptogram causes confusion due to loss of contrast when it is attempted to decipher the cryptogram. The relay objective lens 25 restricts the degree of overlapping of the individual images in the final composite image to a value greatly below the degree of overlap present in the aerial images. A surprisingly large degree of overlap is tolerable in the final composite image, however, especially when working with a white text on a black background. Preferably at least about one ninth of the area of each image portion in the final composite image is substantially free from overlapping in order to avoid excessive loss of contrast in the reconstituted image of the clear text.

The stop 44 acts to restrict and to limit the degree of relative overlapping of the different image portions in the final composite image by restricting the image light rays receivable from the various different ones of the lenticles 40 to those rays falling within the cones defined by the stop 44 at one end and the respective lenticles 40 at the other. The principal factors that affect the relative overlap ratio in the final composite image are the diameter of the stop 44, the spacing between the stop 44 and the screen 20, the spacing between the screen 20 and the aerial image, the powers of the various lenticles 40, and, to a relatively small extent, the sizes of the lenticles. In general, the relative overlap is directly proportional to the size of the stop 44 and to the spacing between the screen 20 and the aerial images. It is inversely proportional to the spacing between the stop 44 and the screen 20, to the spacing between the screen 20 and the aerial images, and to a relatively small extent to the sizes of the lenticles 40.

The relative overlap may be most readily controlled in operation of the device by varying the size of the aperture stop 44, which may, if desired, be an adjustable diaphragm.

The lenticles 40 are all of positive power, and the space between the screen 20 and the object plane defined by the front wall 28 of the housing is greater than the focal length of the strongest one of the lenticles 40, thereby insuring the formation of a real aerial image in the intermediate region 38 by each one of the lenticles 40. The nature of the cryptogram and the difficulty with which it may be deciphered without access to an optical device similar to the one on which it has been made depends to a large extent upon the sizes of the individual lenticles 40 relative to the nature of the clear text to be enciphered. Presently available empirical results indicate that the optimum lenticle size in a screen for use in enciphering and deciphering personal signatures is on the order of one-tenth inch diameter, or about one one-hundreth square inch area. Lenticles of this size produce sufficient confusion in the cryptogram to render it highly difficult to decipher without detailed knowledge regarding the screen 20 with which it was made.

The objective 25 may be of any desired power. Its selection will depend on the relative size of the final composite image it is desired to form on the film 42, as well as on the overall size and optical speed desired for the complete device and the overlap considerations hereinabove described. At present, it is preferred to use a relatively short focal length objective in order to achieve a minification in the final image relative to the aerial image without making the device of inconveniently large size.

The screen 20 is composed of a mosaic of lenticles, preferably of randomly selected shapes, which may be individually formed and cemented together. Preferably, however, for maximum economy and ease in manufacturing a relatively large number of substantially identical screens, the screen is formed as a unitary molding or casting of a transparent plastic such as, for example, Lucite, or polystyrene.

The lenticles are arranged with their optical axes all generally parallel to each other.

They may be of various different powers as explained hereinabove and they are edged to different peripheral shapes according to a random or haphazard pattern.

Figure 4:
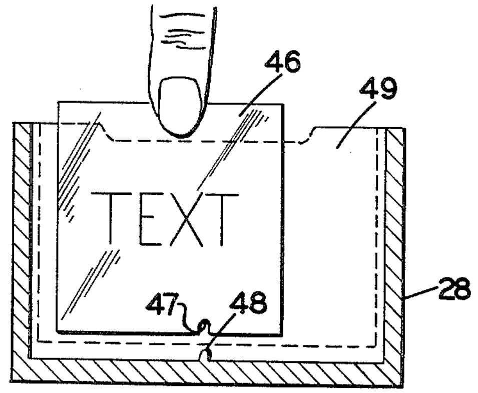
FIG. 4 is a cross-sectional view illustrating the use of keying techniques in the practice of the invention.
Figure 4A:
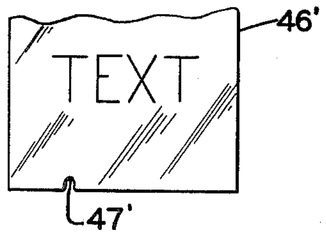
FIG. 4A is an elevational view of a signature card further illustrating the keying technique.

Also, to permit the use of cryptographic keying techniques, as illustrated in FIG. 4, the screen 20 is preferably made substantially larger than the size of the portion of the signature card or other subject matter it is desired to encipher. The signature card, or other text to be enciphered may then be positioned to cover only a selected portion of the object plane, and the cryptogram will be made in accordance with the particular portion of the screen 20 through which it is imaged. Since the lenticles 40 are of randomly selected different peripheral shapes and sizes, different portions of the screen 20 form different respective cipher keys. The text, such as the signature cards 46 or 46′ shown in FIGS. 4 and 4A may be keyed to a particular position in the object plane by a notch 47 or 47′ in the edge of the card for engagement with a fixed boss 48 in the front wall 28 of the housing. In this case glass plates 49 are provided for holding the card 46 or 46′ rigidly in position. Any desired positioning arrangement may be employed to key the text in position relative to the screen 20. The notch and boss arrangement shown in the drawings is intended to be illustrative only. The cryptogram then occupies only a portion of the image plane. The film is trimmed after development to include only the desired cryptogram, and is mounted on a card, or other support, which is keyed in correspondence with the keying of the original text, so that it may be readily positioned for deciphering through the same portion of the screen 20 as the one used in making it.

Figure 5:
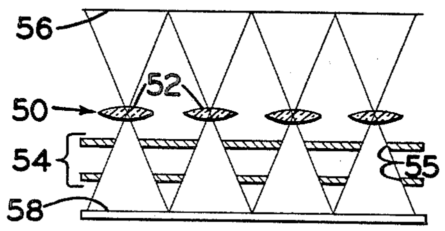
FIG. 5 is a schematic diagram of an optical cryptographic device according to another embodiment of the invention including a lenticular screen and a plurality of correspondingly arranged field stops.

FIG. 5 illustrates an optical cryptographic device according to the invention including an array 50 of spaced lenticles 52 arranged in a common plane, and plural field stops 54 for limiting the overlap among the images formed by the various different lenticles 52 of the array. The field stops 54 may be in either the object or the image space. It takes the place of the relay lens 25 and the aperture stop 44 of the embodiment shown in FIGS. 1–3 to restrict overlapping of the images formed by the respective lenticles 52. The field stops 55 are arranged in alignment with the respective lenticles 52, and are preferably shaped according to a random assortment of shapes to divide up the field according to a selected random pattern of area portions, each one of which is separately imaged to form the cryptogram. Each image is optically rotated separately about the axis of its respective lenticle, thereby producing a composite image in the image plane 56 in which the various area portions are disoriented relative to the orientations of the corresponding portions of the object surface 58.

Figure 6:
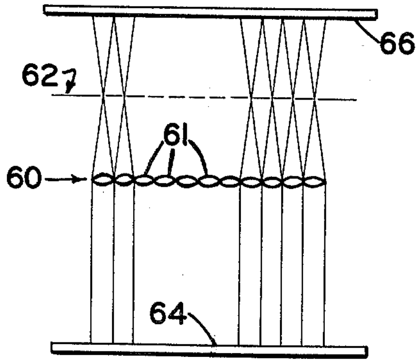
FIG. 6 is a partly schematic isometric view of an optical cryptographic device according to a further embodiment of the invention, including a plurality of telecentric field stops.

The cryptographic device shown in FIG. 6 includes a lenticular array 60 and an array 62 of telecentric stops, one stop being on the optical axis of each one of the lenticles of the array 60. The object and image surfaces 64 and 66, respectively, are each arranged at a distance from the array 60 approximately equal to twice the average focal lengths of the lenticles 61 so that array works at approximately one to one object to image size ratio. If the conjugates are arranged to produce a magnified image, there will be overlapping of the images of the adjacent portions of the object surface. If the conjugates are selected to provide for image minification, maximum use will not be made of the available image surface area.

Figure 7:
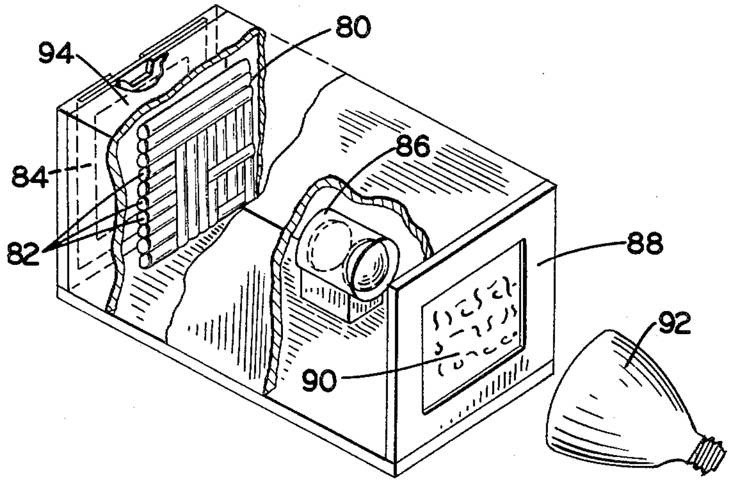
FIG. 7 is a broken isometric view of a device according to the invention including a screen of cylindrical lenticles.

The cryptographic device shown in FIG. 7 is generally similar to the device shown in FIGS. 1–3, except that the device shown in FIG. 7 includes a screen 80 of cylindrical lenticles 82, different ones of the lenticles 82 being differently angularly oriented. The screen 80 forms a plurality of partly overlapping aerial images of portions of the object surface 84, which images are then relayed by the objective lens 86 to the final image plane 88. When the screen 80 is used for enciphering or deciphering personal signatures, the lenticles 82 are preferably about one tenth inch wide, in their direction of curvature. They may be as long as desired.

As used herein and in the appended claims, the term aerial image is intended to include not only images of the kind formed by spherical lenses, but also partial, or pseudo images of the kind formed by cylindrical lenses, which focus light rays perferentially in directions perpendicular to their cylinder axes.

The relay objective 86 for use with a screen 80 having cylindrical lenticles must have a sufficient depth of field to include both the object surface 84 and the aerial images, because in planes parallel to the lenticles 82, there is no imaging by the lenticles, and the relay objective 86 must operate alone to focus the image from the object surface 84 to the final image surface 88.

The device is shown as used for deciphering with a transparency 90, upon which a cryptogram is printed being mounted in the final image plane 88, and illuminated from the rear by any convenient light source 92. In this arrangement, the relay lens 86 images the transparency 90 in an aerial plane adjacent to the screen 80. The screen 80 then optically deciphers the aerial image, and projects an image of the original clear text upon a ground glass screen 94, which is positioned in the object plane 84.

What is claimed is:

1. An optical cryptographic device comprising means defining a limited field in a selected object plane, and a screen comprising relatively small optical image forming elements which are small relative to said field and spaced from said field at an object distance, elements of said screen forming aerial images of relatively small portions of said field at an image distance which is conjugate to said object distance, the refractive surfaces of said elements defining different respective powers and the optical axes of said elements intersecting the locus of the aerial image at a plurality of lateral locations, different ones of said elements defining different respective peripheral shapes, and said screen being so constructed and arranged that the aerial images formed by said screen are differently oriented relative to each other from the relative orientations of the corresponding respective portions of said field.

2. An optical cryptographic device comprising means defining a limited field in a selected object plane, a screen of optical image forming elements spaced from said field for forming aerial images of portions thereof, each one of said portions being less than the entire field, said elements being small relative to said field, different ones of said elements being of different respective peripheral shapes and powers according to a random pattern, whereby the aerial images formed by said screen are differently oriented relative to each other from the relative orientations of the corresponding respective portions of said field, and an objective lens spaced from said screen for relaying the aerial images formed thereby to a selected image plane, said objective lens having a depth of field sufficient to encompass all of the aerial images formed by said screen and to relay all of said aerial images in focus to the image plane.

3. An optical cryptographic device comprising means defining a limited field in a selected object plane, an array of relatively small optical image forming elements which is small relative to said field and spaced from said field at an object distance, elements of said array forming aerial images of relatively small portions of said field at an image distance which is conjugate to said object distance and the optical axes of said elements intersecting the locus of the aerial image at a plurality of lateral locations whereby the aerial images formed by said array are differently oriented relative to each other from the relative orientations of the corresponding respective portions of said field, and an array of field stops spaced from said image forming array limiting the extent to which the aerial images formed by said elements overlap each other, said field stops defining various different shapes according to an irregular pattern.

4. An optical cryptographic device comprising means defining a limited field in a selected object plane, an array of relatively small optical image forming elements which are small relative to said field and spaced from said field at an object distance, elements of said array forming aerial images of relatively small portions of said field at an image distance which is conjugate to said object distance, and the optical axes of said elements intersecting the locus of the aerial image at a plurality of lateral locations whereby the aerial images formed by said array are differently oriented relative to each other from the relative orientations of the corresponding respective portions of said field, an array of field stops spaced from said image forming array limiting the extent to which the aerial images formed by said elements overlap each other, and each one of said field stops being aligned with the optical axes of selected ones of said image forming elements.

5. An optical cryptographic device comprising means defining a limited field in a selected object plane, and a screen comprising relatively small optical image forming elements which are small relative to said field and spaced from said field at an object distance, elements of said screen forming aerial images of relatively small portions of said field at an image distance which is conjugate to said object distance, and the optical axes of said elements intersecting the locus of the aerial image at a plurality of lateral locations, whereby the aerial images formed by said screen are differently oriented relative to each other from the relative orientations of the corresponding respective portions of said field, and including an aray of telecentric stops for limiting the extent to which the aerial images formed by said elements overlap each other.

6. An optical cryptographic device comprising means defining a limited field in a selected object plane, a screen comprising relatively small cylindrically curved lenticles which are small relative to said field and spaced from said field at an object distance, lenticles of said screen forming aerial images of relatively small portions of said field at an image distance which is conjugate to said object distance, and the optical axes of said lenticles intersecting the locus of the aerial image at a plurality of lateral locations whereby the aerial images formed by said screen are differently oriented relative to each other from the relative orientations of the corresponding respective portions of said field.

7. An optical cryptographic device according to claim 6 in which selected ones of said lenticles are angularly offset relative to each other according to a predetermined pattern.

8. An optical cryptographic device comprising means defining a limited field in a selected object plane, a screen of cylindrical lenticles spaced from said plane at a distance greater than the focal length of any one of said lenticles, said lenticles being small relative to said field and of various respective different optical powers and being angularly offset relative to each other according to a predetermined pattern, and an objective lens spaced from said screen for relaying aerial images formed thereby of said field to a selected image plane, said objective lens having a depth of field sufficient to encompass said object plane and all of its conjugates taken through said lenticles.

9. The combination of means defining a limited field in a selected object plane, and a screen comprising relatively small optical image forming elements which are small relative to said field and spaced from said field at an object distance, elements of said screen forming aerial images of relatively small portions of said field at an image distance which is conjugate to said object distance, and the optical axes of said elements intersecting the locus of the aerial image at a plurality of lateral locations whereby the aerial images formed by said screen are differently oriented relative ot each other from the relative orientations of the corresponding respective portions of said field, and keying means for selectively positioning the subject matter to be enciphered or deciphered in a preselected one of a plurality of different positions relative to the optical axes of the elements thereof, the total area of said screen being greater than the area of said field.

10. An optical cryptographic device comprising a copy holder for supporting subject matter to be enciphered or deciphered in a selected plane, a lenticular screen comprising relatively small optical image forming elements which are small relative to the copy holder and spaced from said plane at an object distance, elements of said screen forming aerial images of relatively small portions of subject matter supported therein an an image distance, and the optical axes of said elements intersecting the locus of the aerial image at a plurality of lateral locations, the lenticles of said screen defining different respective peripheral shapes according to an irregular pattern and having an average dimension in their direction of curvature of about one tenth inch, said screen comprising an integral one-piece molding or casting of transparent material, the field-to-image size ratio through said lenticles being less than about four diameters, means defining an image surface, a relay objective lens for relaying aerial images formed by said screen to said image surface, and an aperture stop adjacent to said relay lens for limiting the degree of overlap among adjacent ones of the images relayed to said image surface, the diameter of said stop being selected in view of the average size of the lenticles of said screen, the working conjugates of the lenticles, and the working distance of said relay lens to limit the relative overlap of the relayed images so that at least about one ninth of each relayed image is substantially free from overlap.

References Cited by the Examiner

UNITED STATES PATENTS

| | | |
|---|---|---|
| 1,984,004 | 12/34 | Wildhaber. |
| 2,167,107 | 7/39 | Dvornik. |
| 2,214,412 | 9/40 | Evans. |
| 2,437,255 | 3/48 | Hogan et al. |
| 2,627,199 | 2/53 | O'Brien. |
| 2,915,935 | 12/59 | Pabst et al. |
| 2,981,140 | 4/61 | Ogle. |
| 3,013,314 | 12/61 | Wiklund. |

OTHER REFERENCES

Brouwer et al.: "Two Dimensional Coding of Optical Images," Optica Acta, vol. 2, No. 1, April 1955.

JEWELL H. PEDERSEN, *Primary Examiner.*

EMIL G. ANDERSON, *Examiner.*